May 26, 1959 C. L. EKSERGIAN ET AL 2,888,102

DISK BRAKE MECHANISM

Filed Aug. 30, 1956 7 Sheets-Sheet 1

INVENTORS
Carolus L. Eksergian
Edwin K. Buyze
BY
Wm. R. Glisson
ATTORNEY

May 26, 1959 C. L. EKSERGIAN ET AL 2,888,102

DISK BRAKE MECHANISM

Filed Aug. 30, 1956 7 Sheets-Sheet 2

INVENTORS
Carolus L. Eksergian
Edwin K. Buyze
BY Wm. R. Glisson
ATTORNEY

INVENTORS
Carolus L. Eksergian
Edwin K. Buyze
BY
Wm. R. Glisson
ATTORNEY

DISK BRAKE MECHANISM

Filed Aug. 30, 1956 7 Sheets-Sheet 4

INVENTORS
Carolus L. Eksergian
Edwin K. Buyze
BY Wm. R. Glisson
ATTORNEY

May 26, 1959 C. L. EKSERGIAN ET AL 2,888,102

DISK BRAKE MECHANISM

Filed Aug. 30, 1956 7 Sheets-Sheet 5

INVENTORS
Carolus L. Eksergian
Edwin K. Buyze
BY Wm. R. Glisson
ATTORNEY

DISK BRAKE MECHANISM

Filed Aug. 30, 1956 7 Sheets-Sheet 6

INVENTORS
Carolus L. Eksergian
Edwin K. Buyze
BY Wm. R. Glisson
ATTORNEY

DISK BRAKE MECHANISM

Filed Aug. 30, 1956 7 Sheets-Sheet 7

INVENTORS
Carolus L. Eksergian
Edwin K. Buyze
BY
Wm. R. Glisson
ATTORNEY

United States Patent Office 2,888,102

Patented May 26, 1959

2,888,102

DISK BRAKE MECHANISM

Carolus L. Eksergian, Media, Pa., and Edwin K. Buyze, St. Clair Shores, Mich., assignors to The Budd Company, Philadelphia, Pa., a corporation of Pennsylvania Application August 30, 1956, Serial No. 607,041

5 Claims. (Cl. 188—72)

This invention relates to disk brake mechanism, especially for automobiles, and has for an object the provision of improvements in this art. The brake mechanism dealt with herein is of a type similar to that disclosed in Patents 2,655,229 Eksergian, and, 2,655,230 Buyze, and aims to provide an improved mounting for the mechanism, improved means for applying the brakes, and in addition to provide automatic wear adjustment mechanism and auxiliary hand operating mechanism.

The objects and advantages of the invention will be apparent from the following description of an exemplary embodiment, reference being made to the accompanying drawings thereof wherein.

Figure 2:
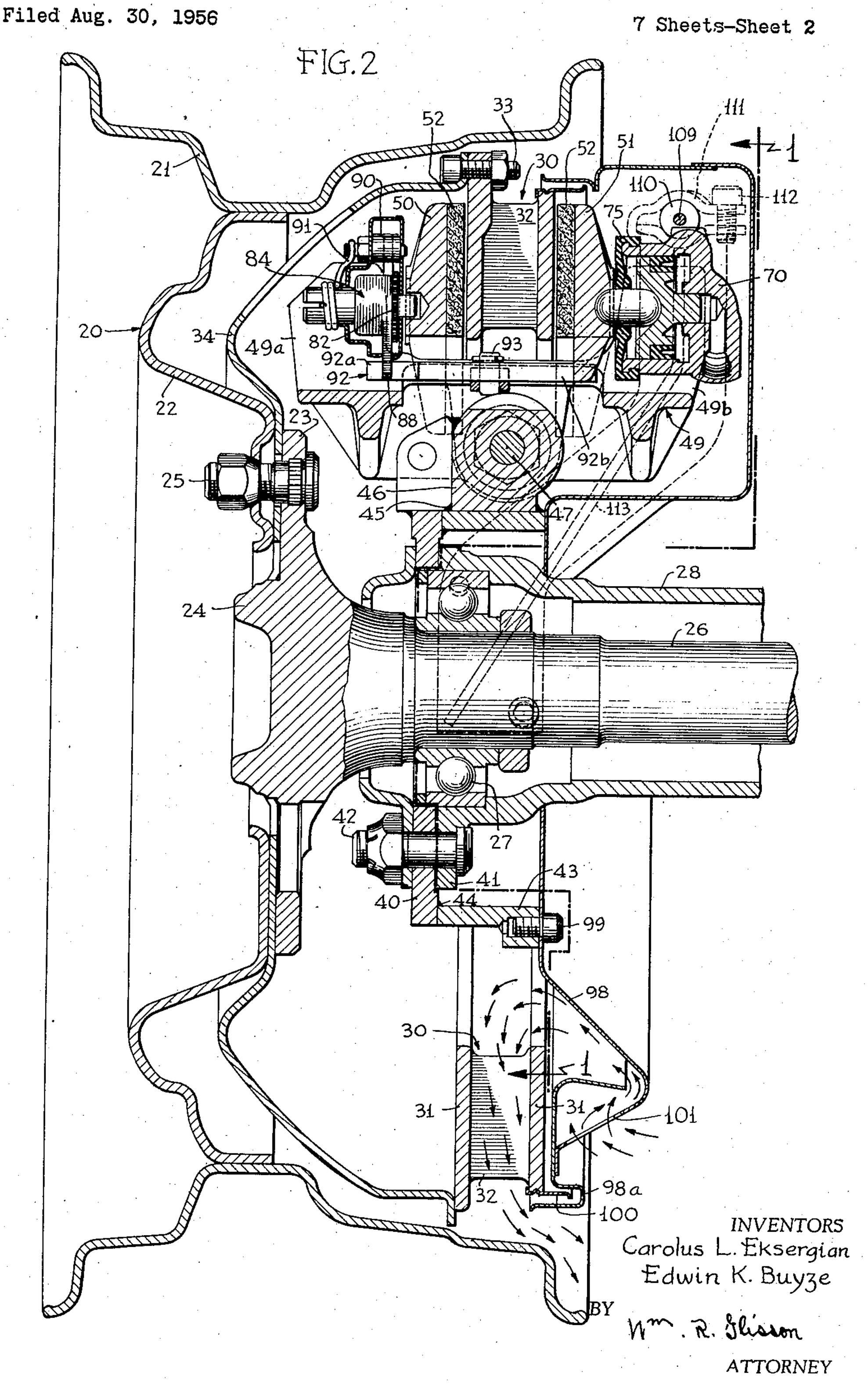
Fig. 2 is an enlarged axial section taken on the line 2—2 of Fig. 1.

As best shown in Fig. 2, a wheel 20, comprising a drop center rim 21 and a disk 22, is secured to the flange 23 of a hub 24 by bolts 25. In the embodiment selected a rear wheel is shown and the hub 24 is formed integrally with an axle 26 carried in bearings 27 in an axle housing 28.

A brake disc 30, comprising braking surface bodies 31 spaced apart by webs 32 for air circulation, is secured by bolts 33 to a spider 34, the spider being secured to the hub 24 by the same bolts 25 which secure the wheel disk to the hub.

A base or bracket 40 supports brake mechanism for coaction with the brake disk 30, the base being secured to a flange 41 of the shaft housing 28 by bolts 42. The base includes an inner annular flange 43 secured to the attached plate portion as by arc welding indicated at 44.

Figure 4:
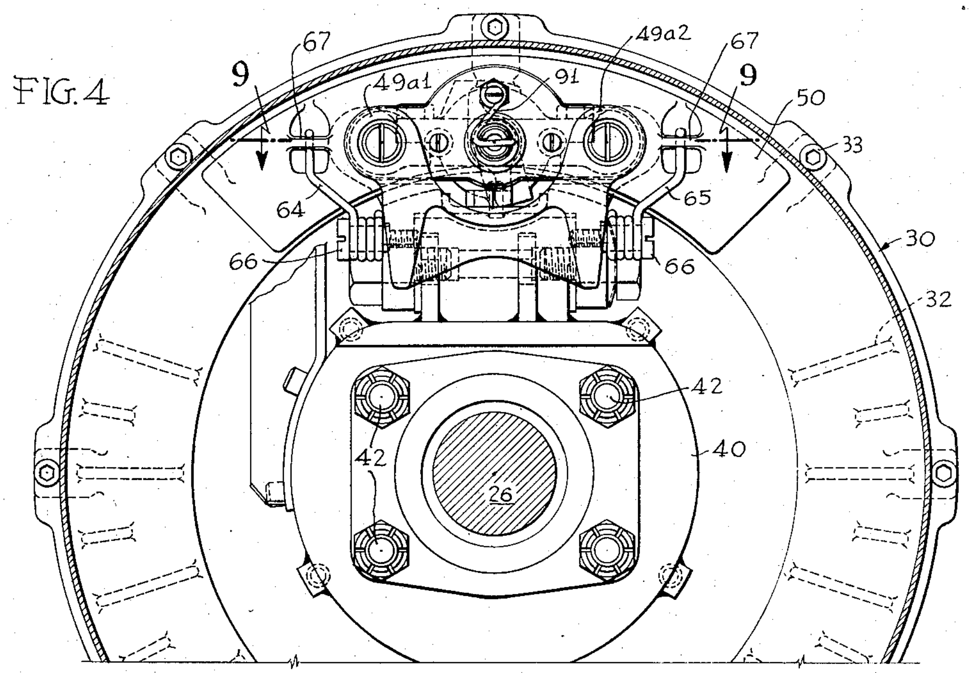
Fig. 4 is a vertical section and elevation taken on the line 4—4 of Figs. 2 and 3.
Figure 5:
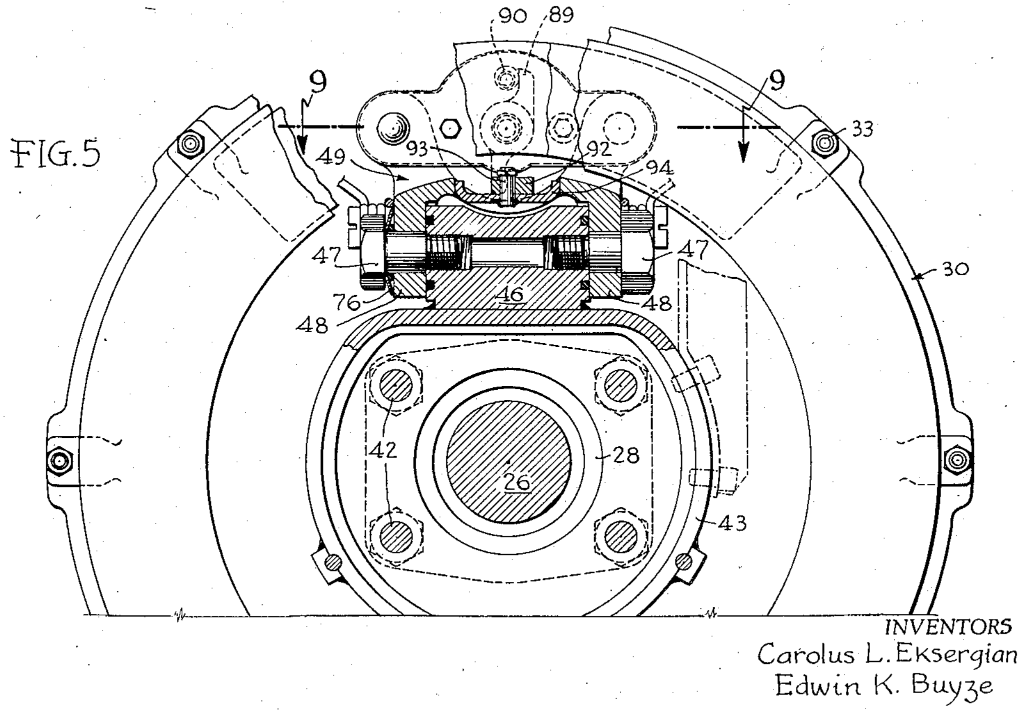
Fig. 5 is a vertical section and elevation taken on the line 5—5 of Figs. 2 and 3.
Figures 9, 10, 11, 12:
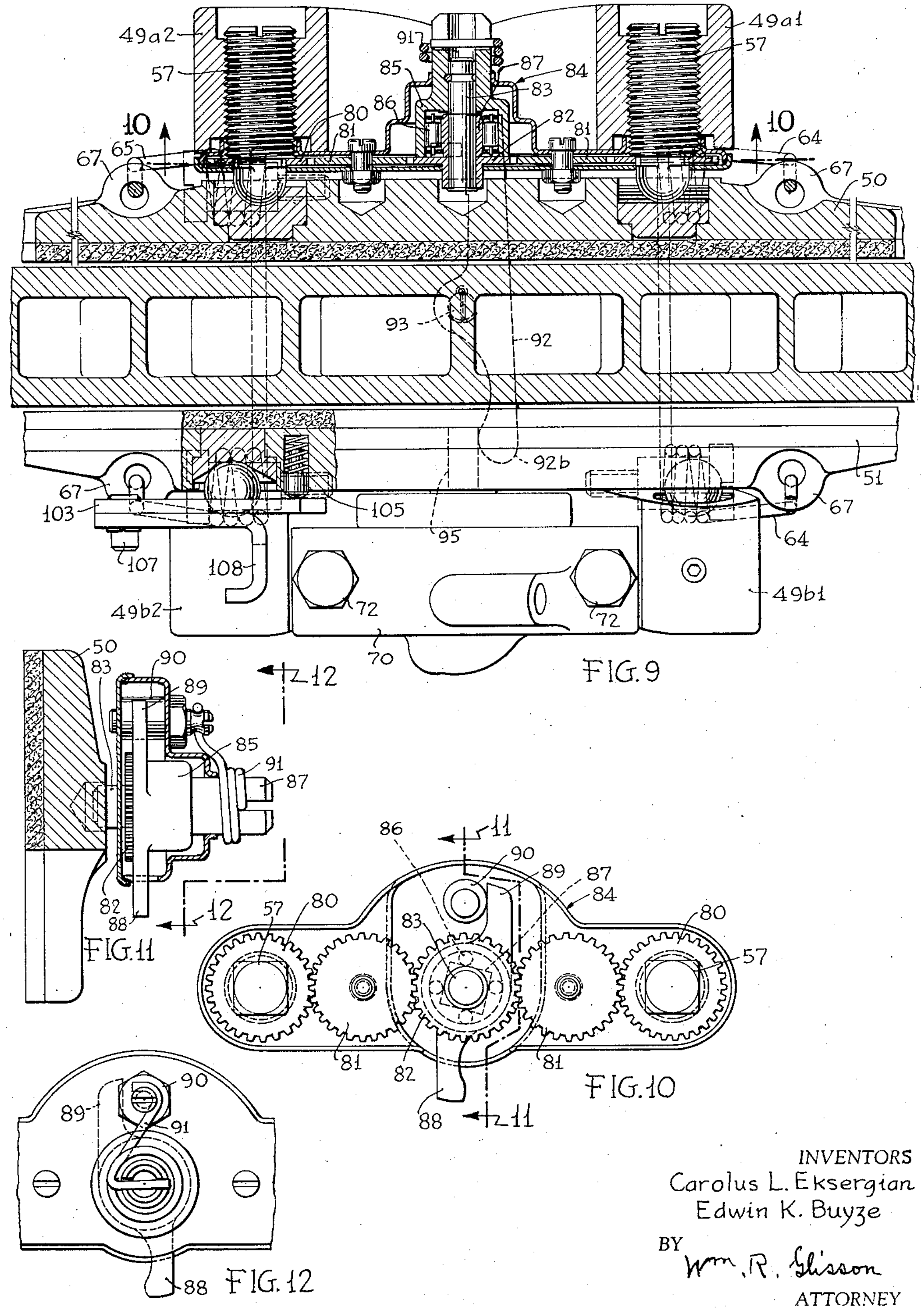
Fig. 9 is an enlarged horizontal section taken on the line 9—9 of Figs. 4 and 5.
Fig. 10 is an elevation, with the cover and other parts removed, taken on the line 10—10 of Fig. 9.
Fig. 11 is a vertical section taken on the line 11—11 of Fig. 10.
Fig. 12 is an end elevation taken on the line 12—12 of Fig. 11.

The plate and flanges 43 are flattened at the top, as shown in Figs. 4 and 5, and upon this flattened surface there is secured, as by arc welding 45, a trunnion support 46. Trunnion pins 47 are threaded into the ends of the support 46 and have turnably mounted on them the bearing projections 48 of a U-shaped brake supporting frame 49. The inner and outer branches or furcations 49*a* and 49*b* of the U-shaped frame 49 have other branches or furcations 49*a*1, 49*a*2 and 49*b*1, 49*b*2 on them to support brake shoes 50 and 51 at circumferentially spaced points, as best shown in Figs. 5 and 9. The shoes carry non-metallic composition brake linings 52 adapted to act against the annular braking surfaces of the brake disk 30.

The outer brake shoes 50 are provided with hardened inserts 55 and 56 to cooperate with the hardened spherical ends of adjustable backing members 57 which are threaded in tapped holes 58 of the secondary furcations 49*a*1 and 49*a*2. One of the inserts, as the trailing one 56 for normal forward rotation, has a spherical cavity to fit the spherical end of a backing member 57 and the other insert 55 has a semi-cylindrical concavity.

The inner brake shoes 51 are provided with hardened inserts 60 having cam or ramp grooves to receive backing balls 61 which act against ramp grooves of hardened inserts 62, 63 carried by the secondary furcations 49*b*1 and 49*b*2. One of the inserts, as the leading one 62, has a conical seat instead of circumferentially aligned ramp grooves which are provided elsewhere and is threaded to provide adjustment to even up the shoe. The conical seat acts as a ramp and also allows the ball to move laterally in its central position.

Figure 3:
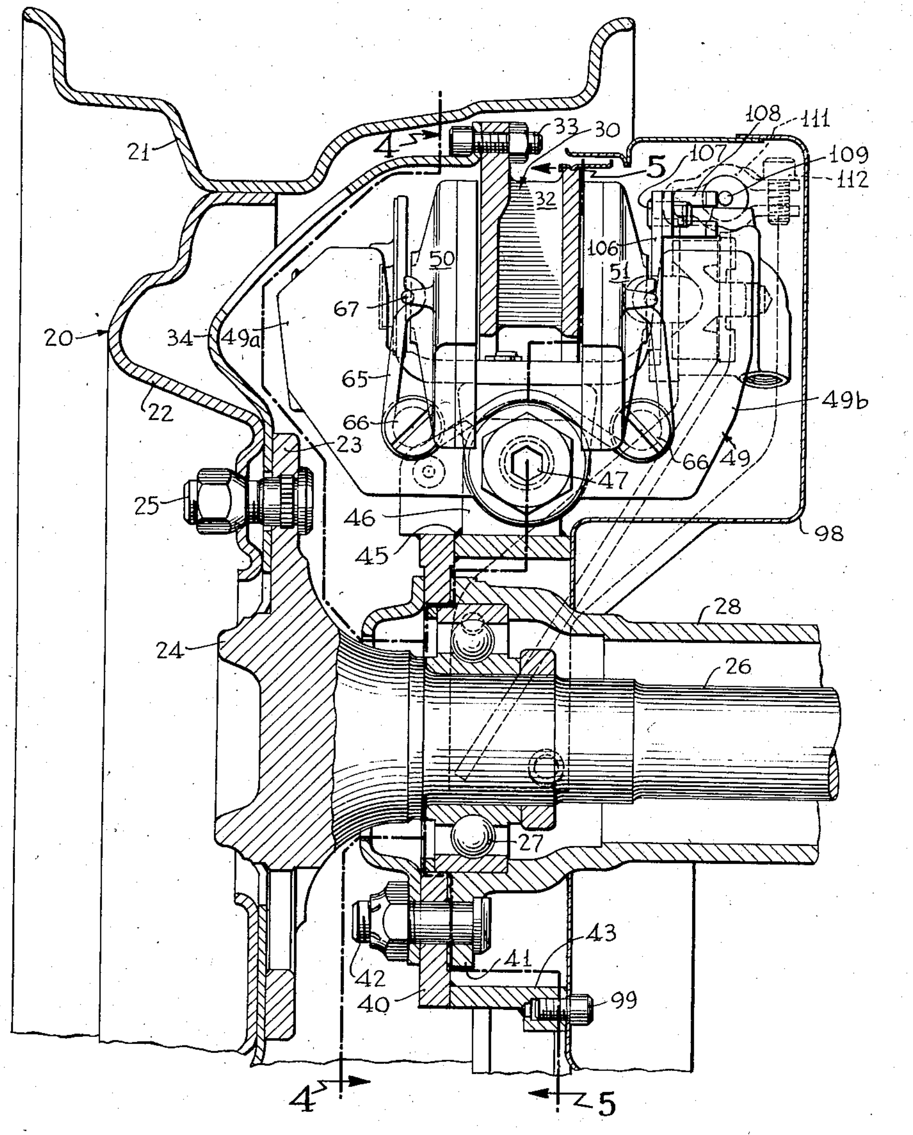
Fig. 3 is an enlarged axial section taken on the line 3—3 of Fig. 1.
Figure 7:
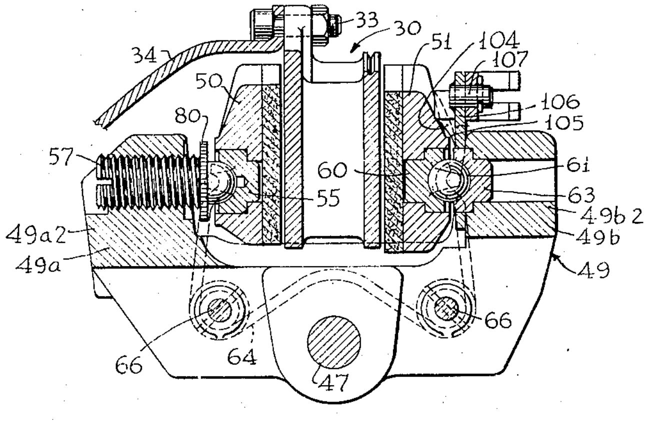
Fig. 7 is a vertical section parallel to the wheel axis taken on the line 7—7 of Fig. 6.
Figure 8:
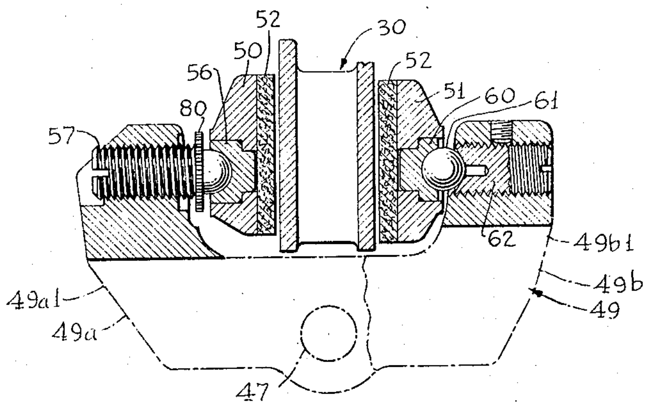
Fig. 8 is a vertical section parallel to the wheel axis taken on the line 8—8 of Fig. 6.

The shoes 50 and 51 are held in normal spread-apart position by coil torsion springs 64 and 65 which have their coil portions mounted on retaining screw posts 66 carried by the sides of the primary furcations 49*a* and 49*b* and their ends secured in loops 67 on the backs of the shoes 50, 51. The central parts of the springs arch to clear the heads of the trunnion pins 47, as best shown in Figs. 3 and 7.

The rear spring 65, with regard to normal forward rotation, is made slightly stronger than the front spring 64 so that the rear ends of the shoes will engage slightly later than the forward ends to ease the action and avoid slap.

The brake shoes are caused to engage with the disk by a fluid actuated power device 70, comprising a cylinder 71 secured to the U-shaped brake frame 49 by cap screws 72 and a piston 73 acting on a spherical-ended push rod 74 which engages flared spherical seats on the piston and inner shoe 51, respectively. A flexible dust shield 75 is arranged over the open end of the cylinder.

The operation of the mechanism as thus far described is as follows: When the power device is energized it pushes the inner shoe 51 against the disk, front end first because of the weaker spring and the conical seat on the front, and the reaction of the power device tilts the U-shaped brake frame on its trunnions and causes the outer shoe to engage the brake disk. Actually, except for friction imposed in the trunnions and friction added by a trunnion spring washer 76 (Fig. 5), the two shoes would engage at practically the same time.

When the inner shoe engages it is moved forward by friction and this imparts a self-energizing action as explained in the patents referred to above.

The brakes may be adjusted by hand for wear but in addition there are provided automatic means for taking up for brake lining wear. These means provide adjustment in the smallest possible increments by a friction ratchet action and also provide completely equalized adjustment at both ends of the shoe by a dual adjustment arrangement. The adjustment is provided by the movement of one shoe relative to the other, in the illustrated form relative circumferential movement being used.

Specifically, as shown in Figs. 9 and 10, a gear 80 is secured to each of the two adjustment screws 57 of the outer shoe 50 and by idler gears 81 the screw attached gears 80 are connected to a central gear 82 secured on a shaft 83 of a friction clutch unit 84. An outer drive sleeve 85 is mounted on the shaft 83 and through friction rolls 86 drives a polygonal surfaced sleeve 87 fast on shaft 83 and through the shaft turns the gear 82. One arm 88 of the outer sleeve 85 provides the turning action and another arm 89 stops against an adjustment cam 90, a spring 91 urging the outer sleeve in the return direction. It also holds sleeve 85 in position axially. A lever 92 pivoted intermediate its length on a pivot pin 93 carried by a member 94 mounted on the U-frame 49 (Fig. 5) has one end **92*a* (Fig. 4) located operatively adjacent the arm 88 of the ratchet device and the other end 92*b* (Fig. 9) located operatively adjacent a projection 95 of the inner shoe 51 so that when the shoe moves circumferentially beyond a normal brake-application distance because of lining wear the ratchet device will be operated and the two adjustment screws 57** turned up.

Axial travel of the shoe could also be used to adjust for lining wear by suitable alteration of the lever actuating means.

The inner side of the wheel-brake assembly is closed by a cover or shield 98 secured to the support flange 43 by cap screws 99, the inner edge being formed with an annular groove **98*a* to form a labyrinth seal with an annular flange 100 press fitted and indented on the inner body portion 31 of the rotary brake disk 30. The cover shield is provided with openings 101** for air circulation (Fig. 2).

Figure 6:
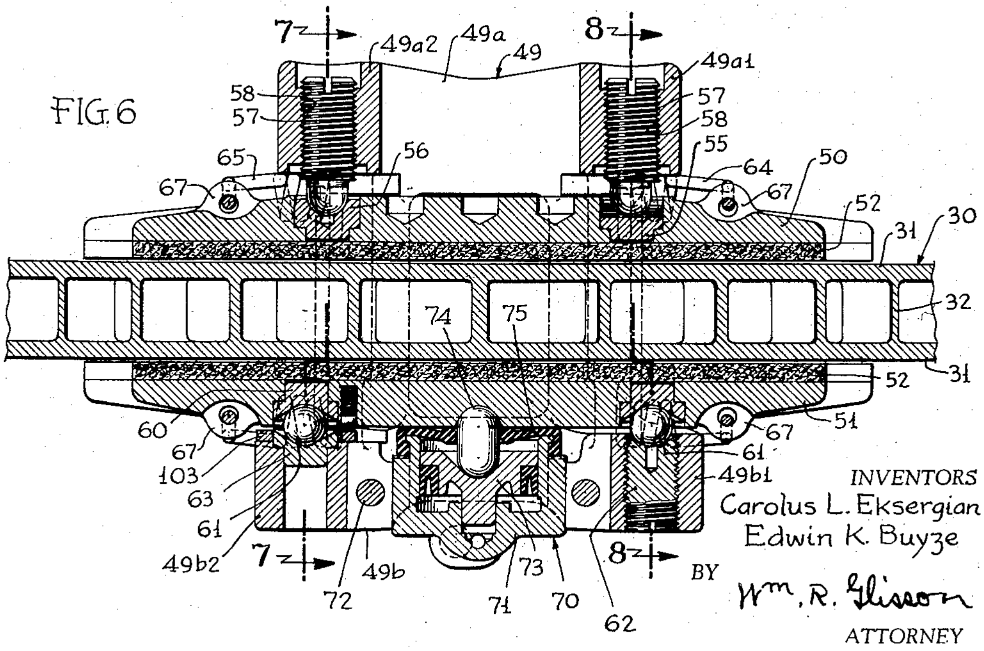
Fig. 6 is an enlarged horizontal section taken on the line 6—6 of Fig. 1.

A hand operated parking brake arrangement is incorporated for actuating the brakes apart from fluid power operation. This arrangement comprises, Figs. 6 and 7, a thin sleeve 103 turnably mounted on a support on the U-shaped frame 49, here the support being the insert 63 having the ball ramp seat, and provided with a cam 104 for acting against a cam surface 105 of the inner shoe 51, the cam surfaces being suitably formed as to accommodate the necessary circumferential movement between the shoe and its backing parts if required.

Figure 1:
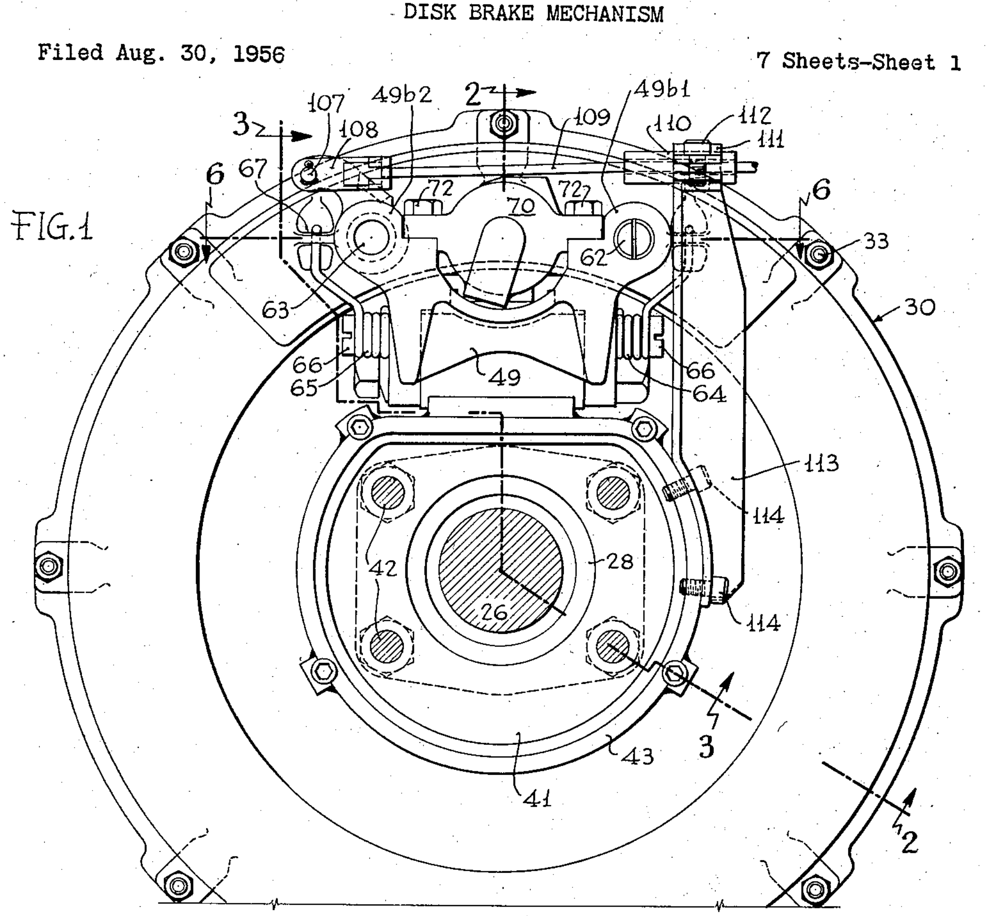
Fig. 1 is a vertical elevation and section of an automobile wheel assembly taken inside the wheel looking outward, the view being taken on the line 1—1 of Fig. 2.

The sleeve 103 is provided with a protruding operating arm 106 carrying a pivot pin 107 on which there is connected a cable anchor piece 108 (Fig. 1) to which an operating cable 109 is connected. The cable is supported on a guide 110 clamped by a cap 111 and screws 112 to the upper end of a bracket 113 secured to the side of flange 41 by cap screws 114. The necessary openings and clearance space are provided for the accommodation of the emerging cable and protruding parts.

Figure 14:
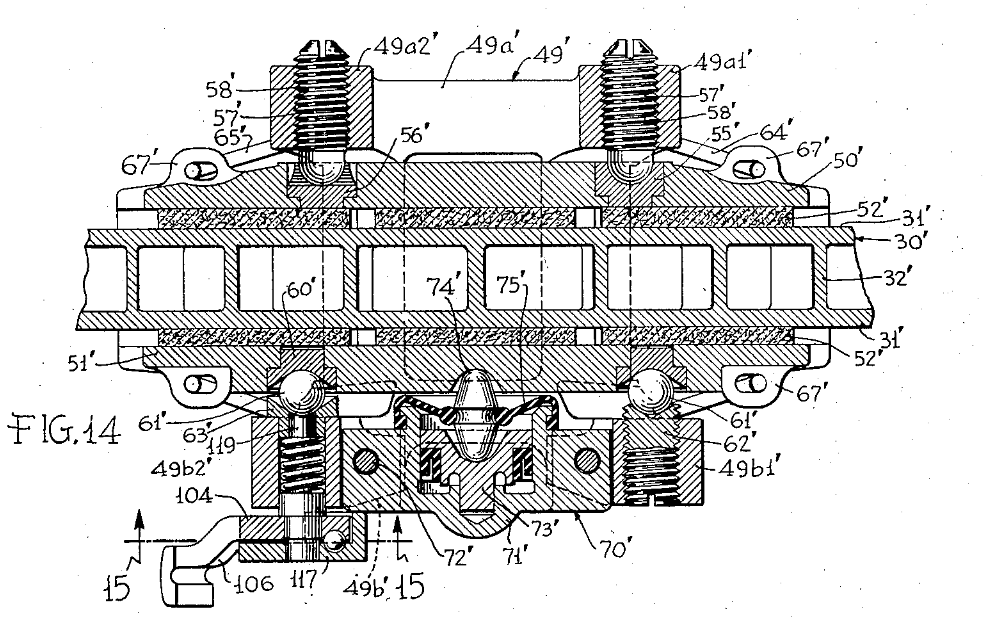
Fig. 14 is a partial section taken on the line 14—14 of Fig. 13.
Figure 13:
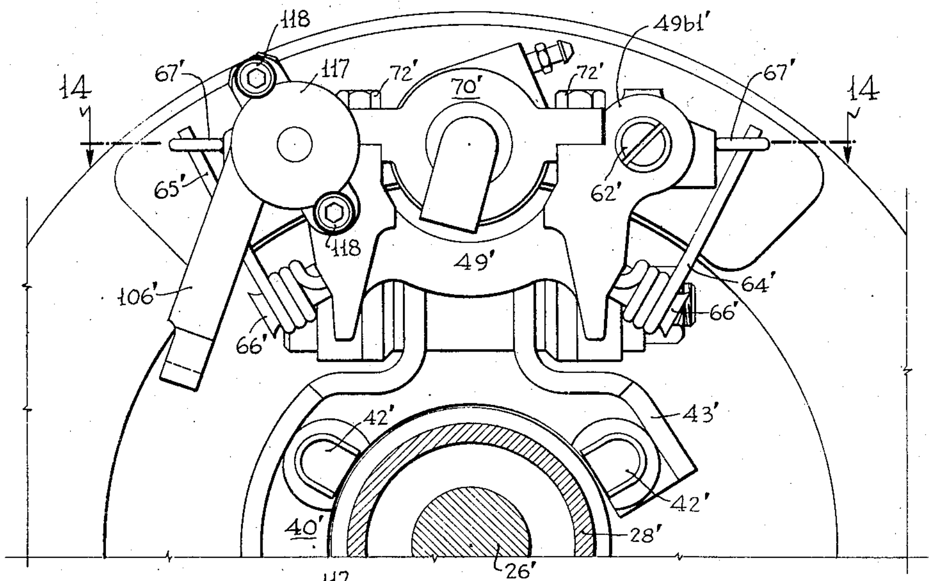
Fig. 13 is a partial inside elevation of a modified arrangement of hand brake.
Figure 15:
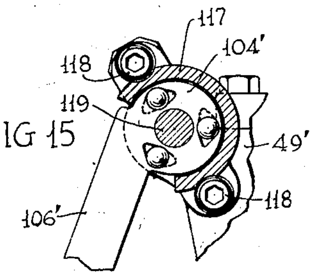
Fig. 15 is a section taken on the line 15—15 of Fig. 14.

Figs. 13 to 15 show a modified form of hand parking brake in which a ball cam plate 104' is mounted beneath a cap 117 which is secured to the U-frame 49' by cap screws 118. A number of cam balls acting against ramp races in the cap and plate produce an inward movement of the plate. The plate bears on a shoulder of a pressure pin 119 which forces the trailing cam ball 61' against the cam race on the inner shoe 51' to apply the brakes.

An operating arm 106' turns the cam plate 104' to apply the brakes, a cable, not shown, being connected thereto, as before. The action is easy because of the low friction produced by the cam balls is very small and there is no danger of locking the parts in brake-applied condition.

It is to be noted that while there is uniform movement at both ends of the shoes and equal automatic adjustment, it is possible to make separate adjustment for either shoe at the two ends initially or at any desired time. The inner shoe can be so adjusted by merely turning the backing screw 62; the outer shoe can be adjusted by backing off the assembly of the friction clutch consisting of 82, 83, 85, 86, and 87 and by removing spring 91 from the post of cam 90. This will allow the complete assembly to be retracted in the case of the cover, thereby disengaging the central gear 82 from idler gears 81. From Figs. 9 and 11 it can be seen that there is room within the case to provide the necessary retracting movement to disengage gear 82 from gears 81. Then each screw and gear assembly 57 and 80 can be adjusted independently of each other. After adjustment is made the friction clutch assembly is brought back into its proper position with gear 82 in engagement with idler gears 81. Then spring 91 is replaced on post 90 to hold the parts in position.

It is seen that the invention provides a simple, economical, dependable disk brake assembly which can be easily adjusted initially and which thereafter adjusts automatically and evenly at both ends of the shoes. The arrangement for engaging the trailing end of the shoes slightly ahead of the front end makes for easy quiet application. The mounting is simple and sturdy and readily installed or removed.

While one embodiment has been described for purposes of illustration, it is to be understood that there may be various embodiments and modifications within the limits of the invention.

What is claimed is:

1. A disk brake assembly, especially for automobiles, comprising in combination, a rotary brake disk, axially movable shoes cooperating with the outer opposite surfaces of said disk, backing means acting on said shoes at circumferentially spaced points to apply them to the disk, means acting conjointly and simultaneously on said backing means of at least one shoe to adjust the shoes evenly together at both ends, and means actuated by the movement of said shoes for adjusting the axial position of the shoes relative to the disk, said adjusting means including a pivoted lever extending across the disk.

2. A disk brake assembly, especially for automobiles, comprising in combination, a rotary brake disk, axially movable shoes cooperating with said disk, one of the shoes also having limited circumferential movement, backing means acting on said shoes at circumferentially spaced points to apply them to the disk, means acting conjointly and simultaneously on said backing means of at least one shoe to adjust the shoes evenly together at both ends, said adjusting means including spaced backing screws for a shoe, turning means on the screws, and means responsive to relative movement between the shoes for turning said screws by equal amounts in unison.

3. A disk brake assembly, especially for automobiles, comprising in combination, a rotary brake disk, axially movable shoes cooperating with said disk, one of the shoes also having limited circumferential movement, backing means acting on said shoes at circumferentially spaced points to apply them to the disk, and means acting conjointly and simultaneously on said backing means of at least one shoe to adjust the shoes evenly together at both ends, said adjusting means comprising spaced backing screws for a shoe, and means responsive to relative circumferential movement between the shoes for turning said screws by equal amounts together.

4. A disk brake assembly, especially for automobiles, comprising in combination, a rotary brake disk, axially movable shoes cooperating with said disk, one of the shoes also having limited circumferential movement, backing means acting on said shoes at circumferentially spaced points to apply them to the disk, means acting conjointly and simultaneously on said backing means of at least one shoe to adjust the shoes evenly together at both ends, said adjusting means comprising spaced backing screws for a shoe, a one-way turning ratchet device connected to both screws, a ratchet arm for operating said turning ratchet device, a lever pivoted between the shoes having one end operatively associated with said arm and the other end disposed adjacent a brake shoe, and means on said brake shoe for operating the arm when the brakes are applied, overtravel beyond normal due to brake wear causing take-up by said screws on the associated brake shoe.

5. A disk brake assembly, especially for automobiles, comprising in combination, a rotary disk open on the inside, a support mounted within the disk opening, a tiltable U-frame pivoted to said support on an axis lying within the plane of said disk, axially movable brake shoes mounted on said U-frame in position to act against axially opposite radial surfaces of said disk, axially movable mounting means for a first one of said shoes comprising circumferentially spaced backing screws carried by the U-frame, gears on said screws, a common adjusting ratchet device operatively geared to said screw-mounted gears, an operating ratchet arm for said ratchet device, a lever pivoted between shoes on said U-frame having one end engageable with said arm and the other end engageable with a turning element carried by the other one of said shoes.

References Cited in the file of this patent

UNITED STATES PATENTS

| | | |
|---|---|---|
| 1,990,252 | Ragsdale et al. | Feb. 5, 1935 |
| 2,245,988 | Lambert | June 17, 1941 |
| 2,536,269 | Driscoll | Jan. 2, 1951 |
| 2,551,252 | Du Bois | May 1, 1951 |
| 2,612,969 | Hawley | Oct. 7, 1952 |
| 2,614,662 | Hawley | Oct. 21, 1952 |
| 2,642,959 | Freer | June 23, 1953 |
| 2,655,229 | Eksergian | Oct. 13, 1953 |
| 2,733,781 | Brisson | Feb. 7, 1956 |
| 2,746,577 | Butler | May 22, 1956 |
| 2,768,710 | Butler | Oct. 30, 1956 |

FOREIGN PATENTS

| | | |
|---|---|---|
| 167,082 | Australia | Feb. 24, 1956 |
| 1,101,244 | France | Oct. 4, 1955 |
| 706,050 | Great Britain | Mar. 24, 1954 |